Figure 1:
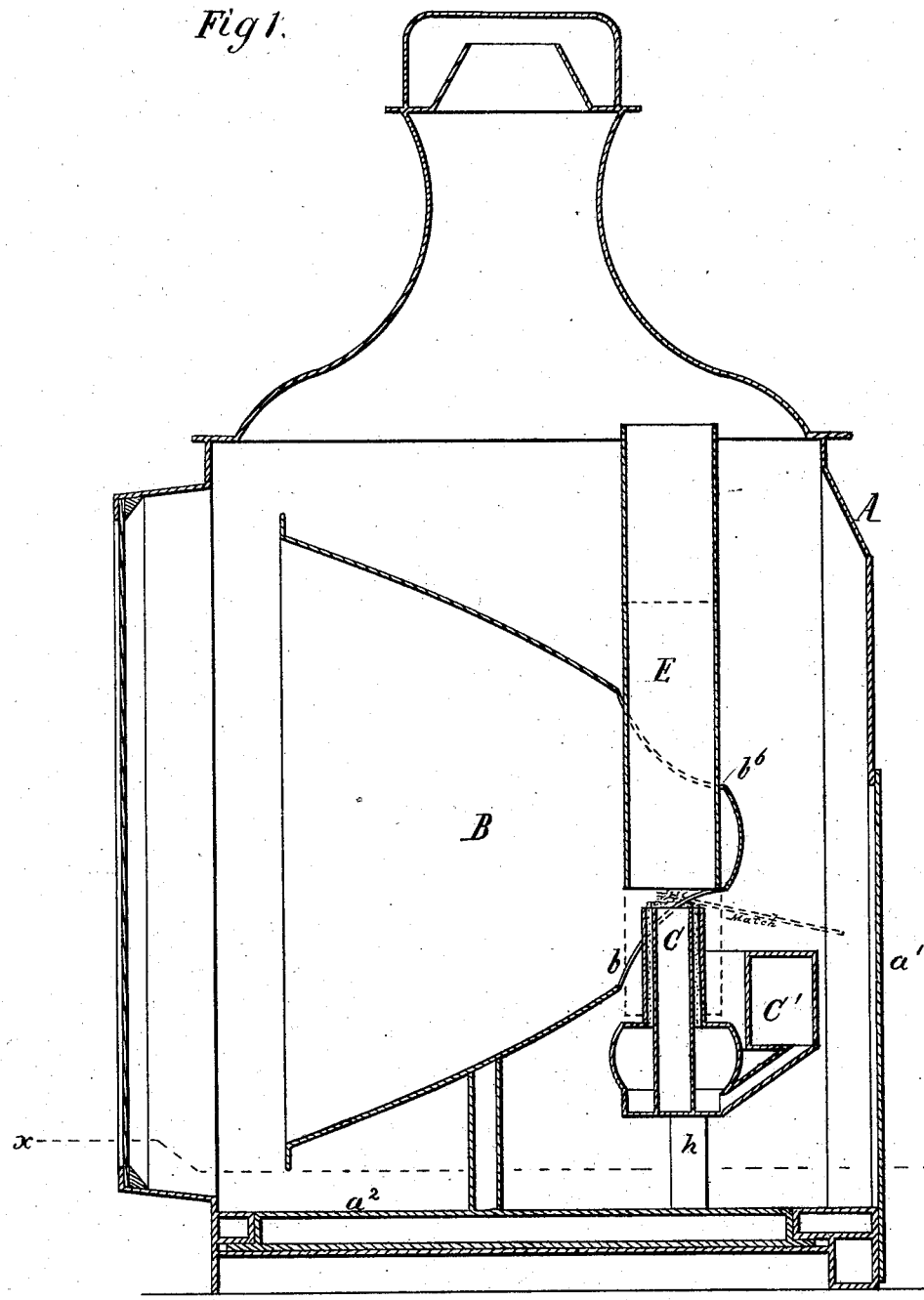

(Model.)

5 Sheets—Sheet 1.

I. A. WILLIAMS.
Head Light for Locomotives.

No. 235,924.                           Patented Dec. 28, 1880.

Witnesses:

Inventor:

(Model.)
5 Sheets—Sheet 2.
I. A. WILLIAMS.
Head Light for Locomotives.
No. 235,924.    Patented Dec. 28, 1880.
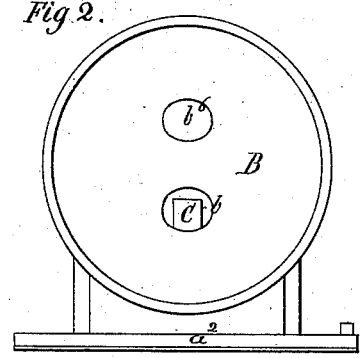
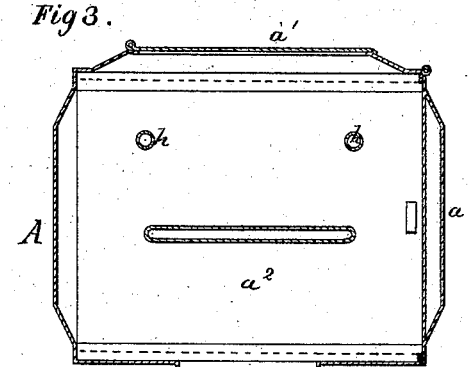
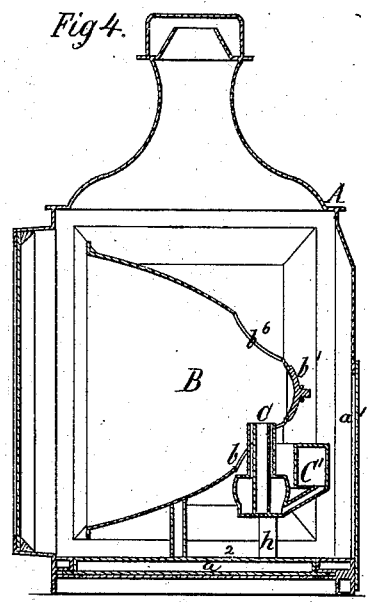
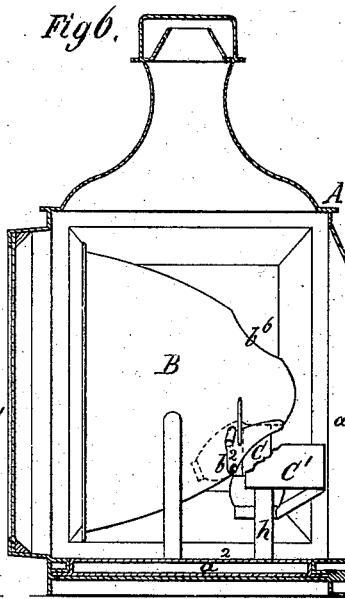
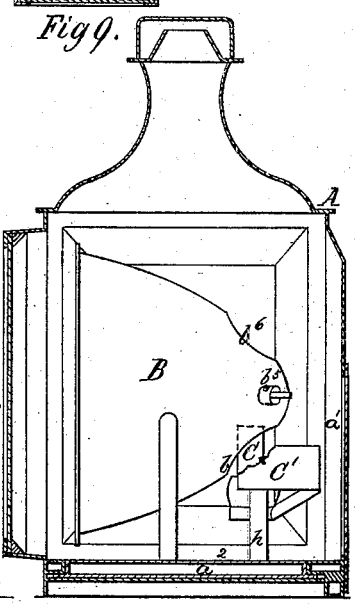
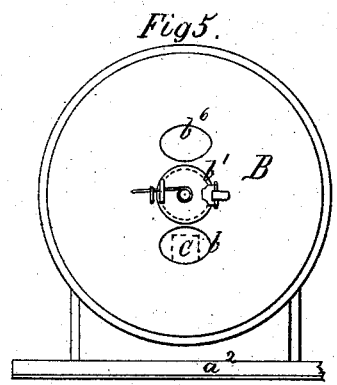
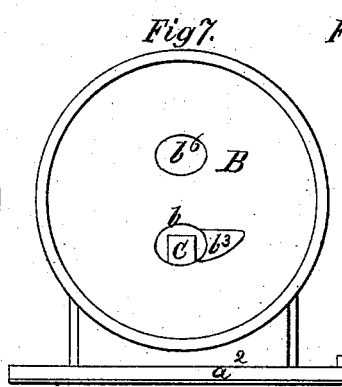
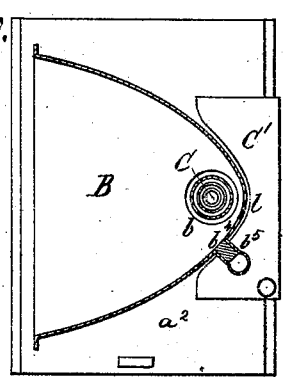
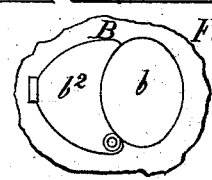
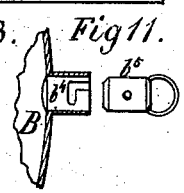
Witnesses:
N. A. Hall
J. P. Theo. Lang.
Inventor:
Irvin A. Williams
by his attorneys
Mason Fenwick & Lawrence
N. PETERS, PHOTO-LITHOGRAPHER, WASHINGTON, D. C.

(Model.)

I. A. WILLIAMS.
Head Light for Locomotives.

No. 235,924. Patented Dec. 28, 1880.

Witnesses:
N A Hall
J. P. Theo. Long

Inventor:
Irvin A. Williams
by his attorneys
Mason Fenwick & Lawrence (Model.)

5 Sheets—Sheet 4.

I. A. WILLIAMS.
Head Light for Locomotives.

No. 235,924. Patented Dec. 28, 1880.

Witnesses:
N. A. Hall
J. P. Theo. Long

Inventor:
Irvin A. Williams
by his Attorneys
Mason Fenwick & Lawrence (Model.)
I. A. WILLIAMS.
Head Light for Locomotives.
No. 235,924. Patented Dec. 28, 1880.
5 Sheets—Sheet 5.
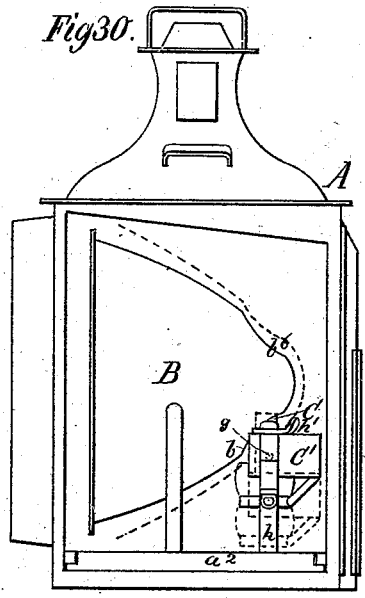
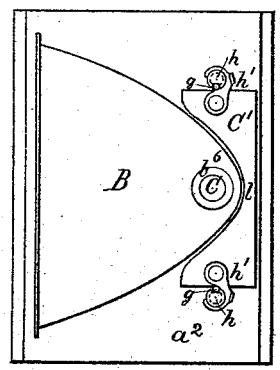
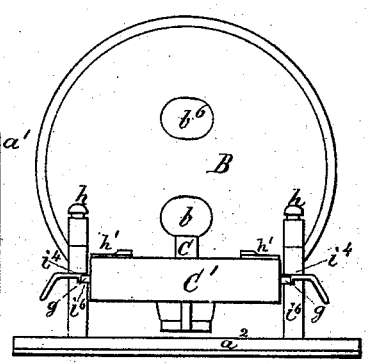
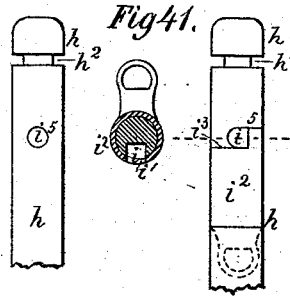
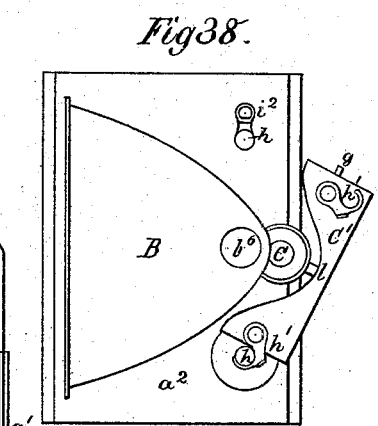
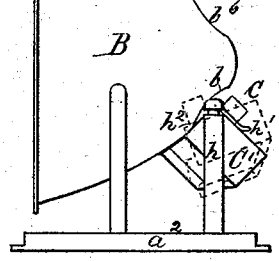
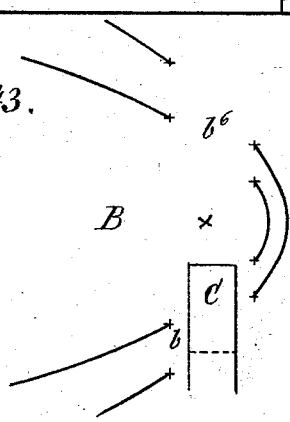
Witnesses:
N A Hall
J. P. Theo. Lang.
Inventor:
Irvin A. Williams
by his attorneys
Mason Fenwick & Lawrence
N. PETERS, PHOTO-LITHOGRAPHER, WASHINGTON, D C

UNITED STATES PATENT OFFICE.

IRVIN A. WILLIAMS, OF UTICA, NEW YORK.

HEAD-LIGHT FOR LOCOMOTIVES.

SPECIFICATION forming part of Letters Patent No. 235,924, dated December 28, 1880.

Application filed October 11, 1880. (Model.)

*To all whom it may concern:*

Be it known that I, IRVIN A. WILLIAMS, a citizen of the United States, residing at Utica, in the county of Oneida and State of New York, have invented certain new and useful Improvements in Head-Lights for Locomotives, of which the following is a specification.

My invention relates to an improved means whereby provision is made for lighting the burner of the lamp or other illuminator within the head-light case by a match or other similar device held in the hand, without the necessity of moving either the burner or the reflector from their normal positions in the head-light case; to an improved means whereby provision is made for either trimming, cleaning, or lighting the burner of the lamp or other illuminator by simply moving either the burner or the reflector to a position within the head-light case which will uncover the burner in part or whole, this result being effected without the necessity of removing either the burner or the reflector from the inside of the case; to an improved means whereby provision is made for the complete removal of the burner from the head-light case, for the purpose of either cleaning, trimming, or lighting, without the necessity of removing the reflector from the head-light case; and also to a reflector movable in the head-light case out of the range of the burner in said case.

The nature of my invention consists, first, in the combination of a head-light case, a reflector of peculiar construction, and a burner; second, in the combination of a head-light case, a movable reflector, and a burner; third, in the combination of a head-light case, a movable burner, and a reflector; fourth, in the combination of a head-light case, a reflector, and a removable burner; fifth, in a head-light provided with a reflector which is movable out of the range of the burner in the head-light case.

Figure 12:
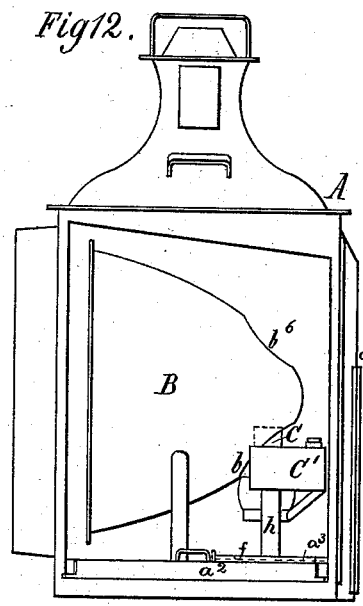
Figure 14:
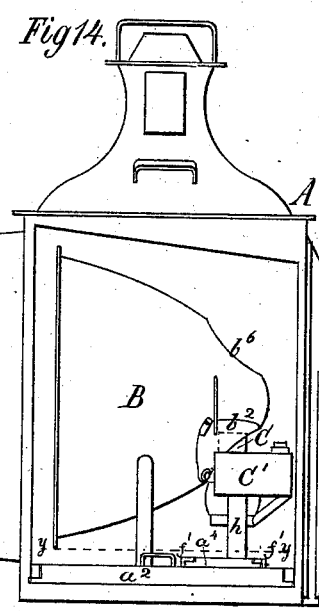
Figure 16:
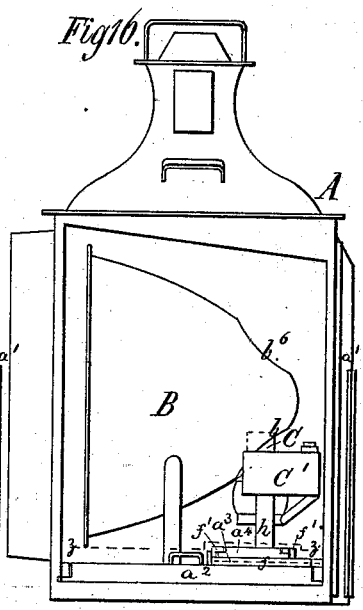
Figure 13:
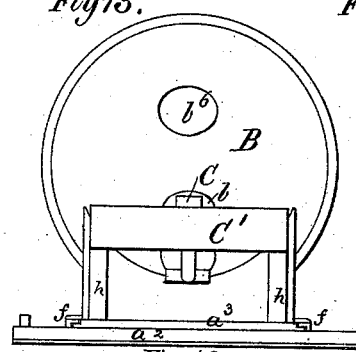
Figure 15:
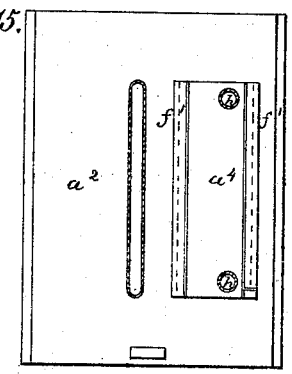
Figure 17:
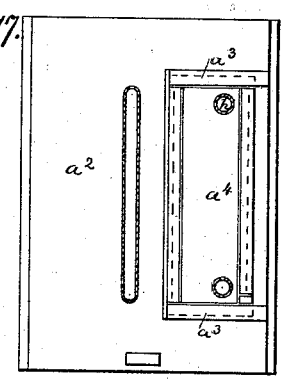
Figure 19:
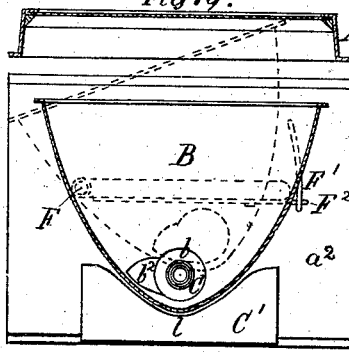
Figure 18:
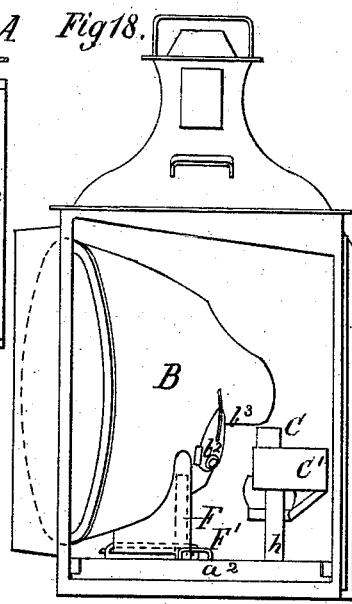
Figure 20:
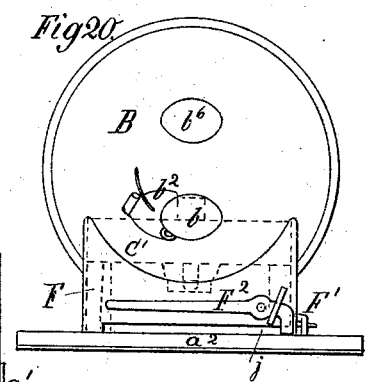
Figure 21:
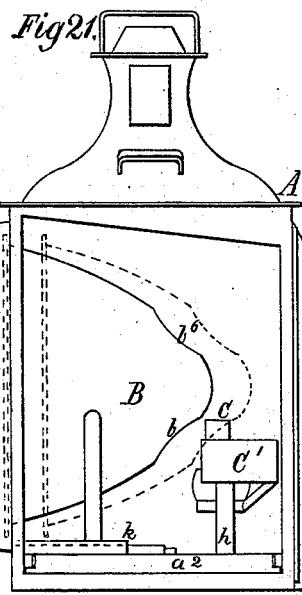
Figure 23:
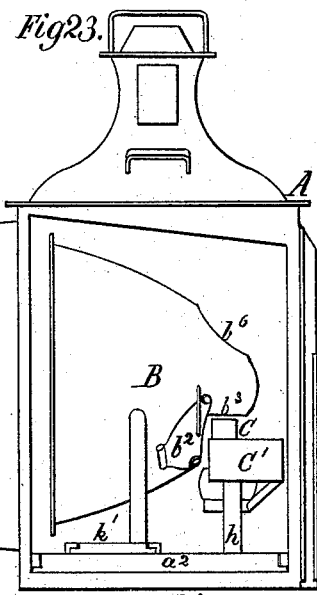
Figure 25:
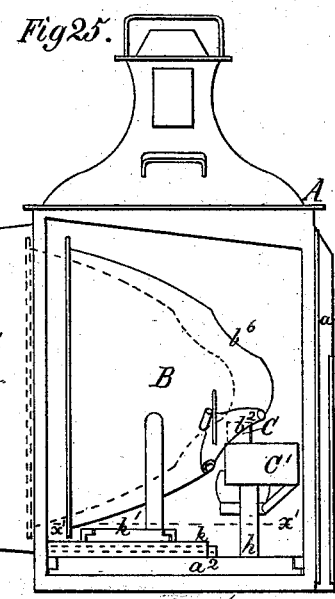
Figure 22:
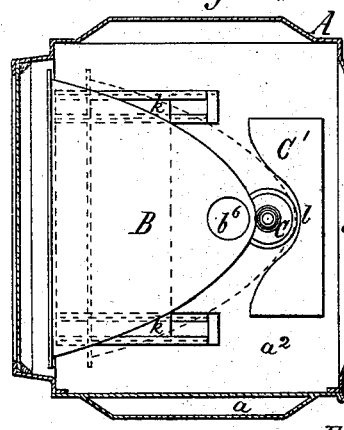
Figure 24:
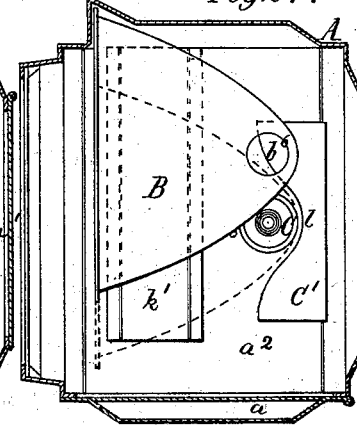
Figure 26:
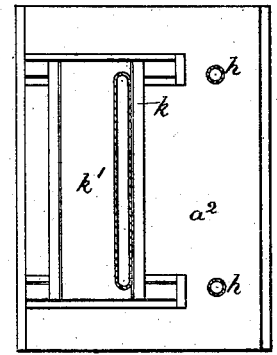
Figure 28:
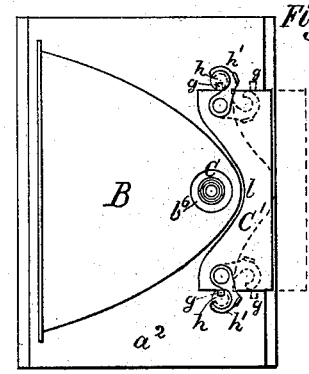
Figure 27:
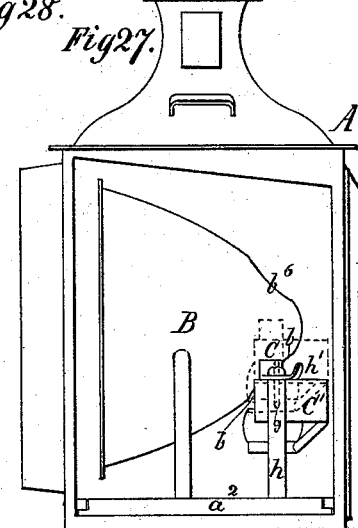
Figure 29:
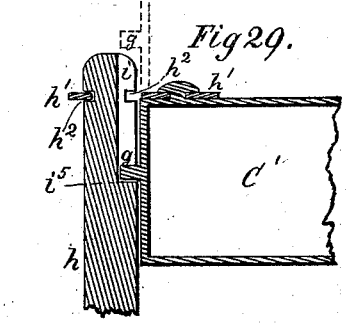

In the accompanying drawings of my improved head-light, Figure 1 is a vertical longitudinal central section of the head-light complete and ready for being lit with a match introduced into the head-light case and into the reflector, and applied to the burner from a point in rear of the front edge of the reflector, the reflector and burner being mounted on the ordinary removable slide of a head-light. Figs. 2, 3, 4, 5, 6, 7, 8, 9, 10, and 11 represent the means whereby the head-light is adapted for being lit without moving either the burner or the reflector from their normal positions and from a position in rear of the front edge of the reflector. Of these views Fig. 2 is a front view of the reflector, the burner-tube, and the ordinary removable slide of a head-light detached from the head-light case. Fig. 3 is a horizontal section in the line $x\ x$ of Fig. 1. Fig. 4 is a vertical longitudinal central section of Fig. 1, modified by applying a door at the apex of the reflector. Fig. 5 is a rear view of the reflector and ordinary removable slide shown in Fig. 4. Fig. 6 is a vertical section of the head-light case and slide, and a side elevation of the burner and reflector, these parts being similar to Fig. 1, except that the reflector is modified by having a portion of lighting-aperture enlarged on one side and a door applied over the same. Fig. 7 is a front view of the reflector and slide shown in Fig. 6. Fig. 8 is a detail view of a portion of the reflector with enlarged lighting aperture and door. Fig. 9 is a vertical section of the head-light case and slide, and a side elevation of the reflector and burner, showing the reflector provided with a plugged lighting-aperture in its side. Fig. 10 is a horizontal section of the reflector shown in Fig. 9, the slide and burner being in plan view. Fig. 11 is a detail sectional view of a portion of the reflector, showing the plug of its side aperture withdrawn. Fig. 12 is a side elevation of the head-light with its side door removed, showing the burner mounted upon an auxiliary slide which moves in a line with the axis of the reflector. Fig. 13 is a rear view of the reflector, burner, and slides shown in Fig. 12. Fig. 14 is a similar view to Fig. 12, but showing the burner mounted upon an auxiliary slide which moves in a line at right angles to the axis of the reflector. Fig. 15 is a horizontal section of Fig. 14 in the line $y\ y$, showing a plan view of the main and auxiliary slide. Fig. 16 is a similar view to Fig. 12, showing the two slides of Figs. 12 and 14 combined and the burner mounted upon the same, so as to be moved in two directions at right angles to each other, independently of the main slide. Fig. 17 is a horizontal section in the line *z z* of Fig. 16. Fig. 18 is a view similar to Fig. 12, but showing the reflector pivoted directly to the ordinary slide and swung around horizontal away from the burner, which is shown attached directly to the said slide; also showing the side door represented in Figs. 6, 7, and 8 applied to the reflector in order to permit the reflector to pass by the burner, and also to facilitate lighting the burner from the side of the reflector. Fig. 19 is a horizontal section of a portion of Fig. 18, the reflector being shown in full black lines in its normal position, and in dotted lines swung around so as to uncover the burner, as in Fig. 18. Fig. 20 is a rear view of the reflector, its controlling and locking mechanism, and the ordinary slide. Fig. 21 is a view similar to Fig. 18, but showing the reflector without a side-lighting aperture and mounted upon a slide which moves in the line of the axis of the reflector. Fig. 22 is a horizontal central section through the head-light case, showing the parts represented in Fig. 21 in plan. Fig. 23 is a similar view to Fig. 21, but showing the reflector mounted upon a slide which moves at right angles to the axis of the reflector, and showing the reflector provided with the side-lighting device of Fig. 18, the door of which device is open. Fig. 24 is a section similar to Fig. 22, showing the parts of Fig. 23 in plan and the reflector moved sidewise from over the burner. Fig. 25 is a view similar to Fig. 23, the side door being closed, and the reflector being mounted upon the two slides of Figs. 21 and 23, said slides being combined and serving for moving the reflector in two directions at right angles to one another. Fig. 26 is a longitudinal section in the line *x' x'* of Fig. 25. Fig. 27 is a view similar to Fig. 21, but showing the reflector permanently fastened to the ordinary slide, and the burner attached to its support so as to be moved either up or down thereon. Fig. 28 is a plan view of the reflector, burner, and ordinary slide shown in Fig. 27. Fig. 29 is a vertical detail section of the reservoir portion of the burner and one of its supports. (Shown in Fig. 27.) Fig. 30 is a view similar to Fig. 27, showing a means whereby the burner may be moved downward out of the range of the reflector and also backward away from its supports, and thereby adapting it for use with either the improved reflector shown in Fig. 1, or the ordinary reflector shown by dotted lines in this figure. Figs. 31, 32, 33, 34, 35, and 36 are detail views of the construction shown in Fig. 30. Fig. 37 is a view similar to Fig. 27, but showing the burner arranged for being swung horizontally around on one of its vertical supports. Fig. 38 is a plan view of a portion of Fig. 37, showing the burner swung around out of the reflector. Figs. 39, 40, and 41 are detail views of the construction shown in Fig. 27. Fig. 42 is a side elevation of the reflector and burner applied to the ordinary slide, the burner being shown in full lines tilted backward on its bearings from the position shown in Fig. 1, and in dotted lines tilted forward. Fig. 43 is a diagram of the ordinary and the improved reflector, these reflectors having the center of their focus at the same point. This diagram illustrates the relative position of the top of the burner with respect to the highest point of the lighting-aperture, and shows that while the tip of the burner can be reached and lighted through the said aperture of the improved reflector, and also that the burner can be moved out of the range of the reflector without removing the reflector from the head-light case, this is impracticable with the ordinary reflectors and burners.

Heretofore the construction of head-lights for locomotives has been such as to cause a great annoyance in the operation of cleaning the reflector and trimming the wick of the burner. Most of the old constructions have a parabolic reflector with an obtuse apex, and a burner fastened to a base-slide, which can be drawn sidewise from the head-light case, which latter is permanently secured to the front part of the locomotive, either by a frame or by brackets; and in order to light the burner the engineer ascends the narrow platform or beam which forms the front termination of the locomotive, opens the door of the head-light case, and draws out the base-slide, reflector, and burner until about one-third of the reflector stands outside the head-light case. This done, he inserts his hand into the reflector from the front thereof and lifts the chimney off the burner, lights a match outside the reflector-case, inserts it into the reflector from its front end, and lights the burner. He then replaces or readjusts the chimney, moves the slide, reflector, and burner together back into the head-light case, and closes the door.

Head-lights are generally placed high on the locomotive—often higher than the boiler—and it is therefore, under ordinary circumstances, a difficult matter for the engineer to light the wick of the burner of the head-light, as he has to stand upon a very narrow place and stretch his arms to effect it; and in stormy or windy weather the burner cannot be lighted in the open air. It must then be lighted in the engine-house, before the locomotive starts on its regular trip, even if this is in the day-time, and the oil thus uselessly consumed often amounts to considerable loss. Again, when the reflector is to be cleaned or the burner trimmed the base-slide, with the reflector and burner fastened to it, is withdrawn entirely from the head-light case by the engineer and handed down to another person standing below. This done, the engineer then descends from the locomotive in order to attend the operation of cleaning or trimming the said parts, and while such operation is being performed the burner remains in the reflector, thus making it very inconvenient or difficult to clean that part of the reflector which is behind the burner, as well as difficult to trim the wick without soiling the reflector, also to properly trim the rear part of the burner with a pair of scissors while the hand which manipulates the scissors is cramped in the small part of the reflector and the burner hidden from view by such hand. To lessen the above difficulties some head-lights have been constructed with an opening through the bottom of the case, a tubular guideway in line with the center of the burner inserted in said opening, and a match set in a brass tube introduced to the burner through said guideway, the match being "set off" inside the wick-tube; but in this construction the cleaning of the reflector or the trimming of the burner presents the difficulties hereinbefore referred to, and therefore it has not been successful in preventing loss of time and labor, waste of oil, danger of breakage of chimneys, and disarrangement of the different parts by accidental falling of the same, incidental to their removal from and readjustment in the stationary head-light case.

The object of my invention is to avoid the disadvantages above named, also to dispense with the use of passage and guide-tube through the bottom of the head-light case for effecting the lighting of the burner.

A represents a locomotive head-light case, having two doors, $a$ $a'$, and an ordinary base-slide, $a^2$, which has generally been made to slide sidewise from the case and had the reflector B and a burner, C, of a lamp-reservoir, C', attached immovably to it, so as to move with it partly or wholly out of the head-light case.

In order to provide for lighting the wick of the burner C from the rear of the reflector, and without moving the reservoir and burner out of their normal positions, the upper edge of the burner C must stand below the highest part of the binding-surface of the lighting and chimney aperture $b$ of the reflector B, and in order to so locate the burner C, and at the same time get the flame in the proper focus of the reflecting-surface, the reflector must be constructed with a parabolic curve of great depression for the reflecting surface, so that the focus of this surface shall be very near the center of the apex of the reflector—that is, the diameter of the reflector around the focus is greatly reduced in comparison with the diameter of the reflectors now in use.

In Fig. 43 the change of construction as adopted by me is shown by the inner parabolic diagram, and the old form is shown by the outer parabolic diagram. The improved form gives a powerful light-saving reflector, and in consequence of this form being adopted the burner can be set lower down than in ordinary reflectors, or so low down that its upper edge will be lower than the highest part of the binding-surface of the chimney and lighting-aperture $b$, and a lighted match held in the hand can be inserted through said aperture, and the wick lighted from a position behind the front flange or edge of the reflector, as illustrated by dotted lines in Fig. 1 of the drawings. The wick may also be picked, or even partly trimmed, through this aperture while the reflector and burner are in the position shown in Fig. 1. If the reflector were of the old form it would be necessary, in order to get the flame into the proper focus, to have the wick-tube extend up above the highest part of the aperture $b$, and this would prevent the insertion of a lighted match or a picking or trimming instrument through said aperture in a manner to reach and light or pick or trim the wick of the burner. Besides this, the burner and reservoir could not be moved away from the reflector, nor the reflector away from the burner and lamp-reservoir, for the purpose of either trimming, cleaning, or lighting, and these operations would require to be performed from a position in front of the reflector. Again, if the aperture $b$ in the old style of reflector should be made large enough to have the burner withdrawn from the reflector, or the reflector from over the burner, then the reflecting-surface of the reflector would be so impaired that its office as a good locomotive head-light reflector would be destroyed; but by adopting the peculiar parabolic reflector shown, or its equivalent, and setting the burner below the highest part of the binding-surface of the aperture $b$, the proper focus and proper reflecting-surface are secured, together with the advantage of lighting and picking, or partial trimming of the wick of the burner from a position in rear of the front edge or flange of the reflector.

In connection with this part of my invention, I propose to provide either a door, $b'$, in the apex of the reflector, or a hinged portion, $b^2$, at the side of the aperture $b$, which aperture, in this instance, will be enlarged by cutting an angular notch, $b^3$, into the reflector, as shown. The portion $b^2$ will cover the notched part $b^3$, and in some instances a round hole, $b^4$, will be cut into the side of the reflector, and a plug, $b^5$, inserted into the same, all of which modes of construction are equivalents of my invention for lighting the wick of the burner from a position in rear of the front edge of the reflector. When either the door $b'$, hinged portion $b^2$, or plug $b^5$ is employed the inner surface thereof will be burnished bright or covered with the same material as the other reflecting-surface of the reflector, and thus an unbroken reflecting-surface will be maintained, notwithstanding a part thereof is removable for the purpose of affording access to the wick of the burner.

To carry out the second part of my invention, either the burner, with its reservoir, or the reflector is made movable in such a manner that the wick of the burner shall not be covered by the reflector while the operation of trimming or cleaning is being performed. The burner, with its reservoir, may be mounted upon a slide, $a^3$, (see Figs. 12 and 13,) which moves backward on a line with the axis of the reflector. This slide moves in guides $f$, upon the base-slide $a^2$, and by moving it toward the door $a'$ the burner can be moved out of the reflector, and can be either cleaned or trimmed or lighted within the case A, or by a further movement of the slide the burner and reservoir can be removed from the head-light case entirely through the door $a'$. A similar slide, $a^4$, (see Figs. 14 and 15,) arranged in guides $f'$ of the slide $a^2$, may be applied at right angles to the axis of the reflector, and the burner and reservoir mounted upon the same. With this construction the burner and reservoir can be moved by opening the side door, $a$, so as to bring the burner out of the reflector, and thereby afford great convenience for either cleaning, trimming, or lighting; or the slide can be moved, with the burner and reservoir, entirely out of the head-light case through the door $a$.

If desirable, the two slides $a^3$ and $a^4$ may be used together, one arranged at right angles to the other—that is to say, the slide $a^4$ may be mounted upon the slide $a^3$, and this latter slide have the burner and reservoir attached to it. The slide $a^4$ will move in guides of slide $a^3$, and the slide $a^3$ will move in guides of base-slide $a^2$. Under this construction the two slides may move together and with the burner and reservoir in a direction parallel with the axis of the reflector; or the slide $a^4$ may move alone, with the burner and reservoir, in a direction at right angles to the axis of the reflector.

The same facilities for moving the burner and reservoir partly away from the reflector, or wholly out of the head-light case, are afforded by the construction shown in Figs. 16 and 17 that are secured by the constructions previously described, and at the same time the movement may be either through the back door, $a'$, or side door, $a$, of the head-light case.

In the movement of the burner and reservoir at right angles to the axis of the reflector, as shown in Figs. 14 and 15, the hinged portion $b^2$ of the reflector is turned out of the way, as illustrated by dotted lines in Fig. 6, in order to allow the burner to pass out of the reflector without obstruction. This hinged portion is not necessary in the construction shown in Figs. 16 and 17.

Instead of mounting the burner and reservoir on any other slide than $a^2$, short journals $g$ may be provided on the reservoir $C'$, and these may be fitted in bearings of slotted supports $h\ h$, and pivoted fastening-hooks $h'\ h'$ may be provided for steadying the burner and reservoir while in use, as illustrated in Figs. 27, 28, 29, 30, 31, 32, 33, 34, 35, 36, 37, 38, 39, 40, 41, and 42. The hooks $h'\ h'$ are pivoted to the top of the reservoir and swing round under shoulders $h^2$ of the supports $h$ of the reservoir. With this construction the burner and reservoir can be tilted downward and forward, and then moved upward and backward, as illustrated by dotted lines in Figs. 29 and 42, and thereby removed from their supports. The short journals $g$ slide and turn in slots $i$, formed in the supports $h$, when the adjustment just described is effected; or the burner and reservoir can be tilted outward and downward and moved backward away from the supports $h$. The short journals $g$, which are supported in their normal position $i^5$ by shoulders $i^3$, formed by the vertically-slotted sleeves $i^2$, are allowed to descend in slots $i\ i$ when the sleeves $i^2$ are turned partly around, and thereby come in line with horizontal passages $i^4$, formed between the lower ends of the slotted sleeves $i^2$ and shoulders $i^6$ of the supports $h$.

In Figs. 34 and 35 the slots $i$ and $i'$, which permit complete up or down movements of the short journals from the normal position $i^5$, are shown open, and in Fig. 33 they are shown closed, and these slots are closed at the normal position $i^5$ of the journals by turning the sleeves partly around, said sleeves thereby becoming a support or rest for the short journals of the reservoir, and the hooks $h'$ serving for keeping the reservoir steady or horizontal when they are swung around under the shoulders $h^2$.

When the burner and reservoir are to be moved on the short journals $g$ in the manner described the hooks $h'$ are swung around from under the shoulders $h^2$, this operation leaving the reservoir free to be tilted forward and moved upward and backward out of and away from the supports $h$. If the burner and reservoir are to be tilted backward and moved downward and backward away from the supports $h$, the sleeves $i^2$ are turned around on the supports, so as to completely open the downward slots $i\ i'$.

If it is only desired to tilt the burner and reservoir either forward and downward, or backward and downward, while resting at the normal position $i^5$, as illustrated in Fig. 42, this can be done by simply swinging the hooks $h'$ from under the shoulders $h^2$ and tilting the reservoir backward or forward on its short journals $g$. When the burner, with its reservoir, is thus tilted on its short journals $g$ an increased area of space is formed between the higher portions of the margin-line of the lighting and trimming aperture $b$ and the tip of the burner, and thus greater convenience for inserting trimming, picking, or lighting instruments is afforded, while the reflector and the supports of the burner and reservoir occupy their normal positions with respect to each other on the base-slide $a^2$ of the head-light.

In Figs. 37, 38, 39, 40, and 41 the burner and reservoir are shown capable of swinging around horizontally with or in one of the supports $h$ of the reservoir. When the burner and reservoir are to be swung around, as shown in Fig. 38, one of the hooks $h'$ is unfastened, and one of the sleeves $i^2$ is moved around, so as to form a side outlet at the normal position $i^5$ for one of the journals of the reservoir to pass through, such side outlet being similar to the horizontal passage $i^4$ below it. With this construction the burner and reservoir can be moved out of range of the reflector, and thus be more conveniently cleaned, trimmed, or lighted.

The burner C is usually provided with a glass or other suitable chimney, E, and this chimney passes up from the base of the burner through the aperture $b$ and through an aperture, $b^6$, in the reflector. The apertures $b$ and $b^6$ are elliptical in form, but, by reason of being formed in curved inclined portions of the reflector, are adapted for a cylindrical chimney. The upper end of the chimney extends up beyond the reflector, and by said extended end it can be lifted above the burner by the hand of the engineer while the parts of the head-light occupy their normal operative positions; and this chimney can be held in one hand while the lighted match is applied with the other hand of the engineer to the wick for the purpose of lighting the burner, the lighted match being passed through the aperture $b$ of the reflector.

In Figs. 18, 19, and 20 the reflector is shown connected on one side with the base-slide by a pivot, F, and on the other side by a segment guide-bar, F', and latching-bar F². By this construction the reflector can be swung forward and around out of the range of the burner C, for the purpose of either cleaning the reflector or for affording greater convenience of access to the burner in trimming, cleaning, or lighting it. The latching-bar F² locks the reflector in its proper operative position, after it has been swung back on its pivot, by falling behind a shoulder, $j$, of the base-slide, as illustrated in Fig. 20. In making this horizontal movement of the reflector the hinged portion $b^2$ may be moved away; but if the elliptical aperture $b$ is made of proper proportionate size it will not be necessary to move the hinged portion $b^2$ away from its normal position.

In Figs. 21, 22, and 26 the reflector is applied in a slide, $k$, mounted upon the base-slide $a^2$. The slide $k$ moves in guides of the base-slide in the direction of the axis of the reflector B. The normal position of the reflector is shown by dotted lines in Figs. 21 and 22, and the position to which it is moved forward out of the range of the burner is shown in full black lines. The reflector, when moved forward, permits the burner to be cleaned, trimmed, or lighted with great convenience.

In Figs. 23 and 24 the reflector is shown mounted upon a slide, $k'$, which moves at right angles to the axis of the reflector. With this construction the reflector can be moved sidewise from the position shown in dotted lines to the position shown in full lines in Fig. 24, and when thus moved it is out of range of the burner, and cleaning, trimming, or lighting of the burner can be very conveniently performed.

In Figs. 25 and 26 the two slides $k$ $k'$ are shown mounted upon one another and upon the base-slide. The slide $k'$ moves sidewise in guides of the slide $k$, and the two slides $k$ and $k'$ move forward together in guides of the base-slide. With this construction the reflector can be moved either forward or sidewise, or both forward and sidewise, and be thereby placed out of range of the burner, and so permit the burner to be cleaned, trimmed, or lighted very conveniently while it occupies its normal operative position.

In manufacturing head-lights with my improvements applied to them the oil-reservoir C' is made of such curved shape on its front side, $l$, as will permit the easy tilting of the burner out of the reflector when said burner is hung on short journals $g$, as described. The burner proper, C, is applied opposite the center of the curved side $l$ in such a manner that the top of the burner stands sufficiently below the focus of the reflector to bring the center of the flame in the center of the reflector, as is usual, and in all cases, except when the burner and reservoir are constructed to be lowered, as illustrated in Fig. 30, the opening $b$ should have the upper portion of its binding-surface stand on a higher plane than the top of the burner, so that when the chimney is elevated from the position shown in dotted lines in Fig. 1 to the position shown in full black lines in same figure a match or instrument can be inserted, or so that the burner may be moved backward while the reflector maintains its normal position, or the reflector forward while the burner remains in its normal position. The described construction of the aperture $b$ and arrangement of the burner are important, also, with respect to the forward and backward tilting of the burner, as the same enable the engineer to clean, trim, or pick and light the burner without removing either the reflector or the burner out of the head-light case. These constructions are also important with respect to the upward sliding and backward movement of the burner, as they permit the engineer to move the reservoir and burner from their supports without taking the reflector out of the head-light case.

When the downward and backward movement of the burner and reservoir are adopted the necessity for the peculiar construction of the reflector and its aperture $b$ and of the arrangement of the burner below the highest portion of the binding-line of the aperture $b$ does not exist, inasmuch as the burner can be lowered far enough to admit its being lighted while in the head-light case; or the burner can be removed from its support and cleaned, trimmed, and lighted, either in the case or outside of it, and this, too, while the reflector remains in the case. This last plan of construction is shown in Fig. 30, and an ordinary parabolic reflector is represented by dotted lines, as in contrast with my upward reflector in said figure, and also in Fig. 43 of the drawings.

In the drawings, the head-light case is shown provided with two doors, $a$ $a'$, and by this construction the engineer can light the burner within the case without disturbance from wind, either from the side or the rear, accordingly as he may find it most convenient. If the wind is blowing in the direction of the door $a$ he opens the door $a'$ and lights the burner, and if in the direction of the door a' he opens the door a and lights from that side of the case. It is not essential to have two doors, as a side door and a suitable rear aperture may be adopted, or a single door on either the side or the rear of the case might be found sufficient.

In some instances the base-slide may be divided into two parts, one part supporting the reflector and the other part the burner and reservoir, or this slide may be dispensed with; and in carrying out my invention the contrivances employed for holding the reservoir and reflector in operative position may be substituted by any other suitable equivalent ones, as these form no essential part of my invention. I also would say that any equivalent means to those herein described may be employed for carrying out my invention. For thoroughly cleaning the burner it, after the chimney is raised, may be moved out of the reflector and head-light case, either sidewise or backward, and taken to a locality where the operation can be carried on with more convenience to the engineer.

Prior to my invention it has been common to make a reflector of two portions, each portion being in form of a paraboloid, and one portion being placed in front of the other, so that the axis and focus of the respective portions coincide; and it was common to attach the rear portion of such two-part reflectors to the lamp or burner, and to move the rear part away from the front part, along with the lamp or burner, the burner remaining in the way and as an obstruction to cleaning within the said rear part of the reflector. With my invention the reflector is constructed wholly independent of the lamp or burner, and no portion of it is moved away attached to the burner or lamp, and with my construction the entire reflecting-surface can be cleaned without any inconvenience being experienced from the burner being in front of the open portion of such surface, as in the instance where the reflector is made of two parts and one part moved away with the burner. Further, the burner can be trimmed and lighted without moving away the apex or focal portion of the reflector, and also without moving the lamp or burner out of its normal position, and the burner can be lighted or trimmed by moving it in numerous directions, wholly independent of any movement of the focal portion of the reflector. My invention, as herein set forth, is not intended to cover a reflector made of two paraboloids, one of which is movable away from the other, as a part of the burner or lamp, as shown in Patent No. 32,851; but

What I claim as my invention, and desire to secure by Letters Patent, is—

1. The combination of a burner, a head-light case, and a reflector provided with means whereby access from the outside of the reflector and in rear of its front edge or flange is afforded for either lighting, trimming, or cleaning the burner within the head-light case, without removing the reflector from the case and without moving the burner from its normal position, or a portion of the reflector, as an adjunct of the burner, away, with the burner, from the position of use within the case, substantially as described.

2. The combination of a head-light case, a reflector movable within the case, and a burner, whereby the reflector can be moved out of the range of the burner, and the burner either cleaned, trimmed, or lighted without removing the reflector from the case, substantially as described.

3. The combination of a head-light case, a burner movable in the case, a reflector, and means whereby the burner can be lighted or cleaned or trimmed within the head-light case without removing the reflector from the case and without moving a portion of the reflector, as an adjunct of the burner, away, with the burner, from its position of use within the case, substantially as described.

4. The combination of a head-light case, a reflector, a removable burner, and means whereby the burner can be removed out of the case without removing the reflector from said case, and without moving a portion of the reflector, as an adjunct of the burner, away, with the burner, from its position of use within the case, substantially as described.

5. A head-light provided with a reflector which is movable in the head-light case out of the range of the burner in said case, substantially as and for the purpose described.

Witness my hand in matter of my application for a patent for new and useful improvements in head-lights for locomotives.

IRVIN A. WILLIAMS.

In presence of—
JAMES E. HALL,
CHAS. I. WILLIAMS.